United States Patent Office.

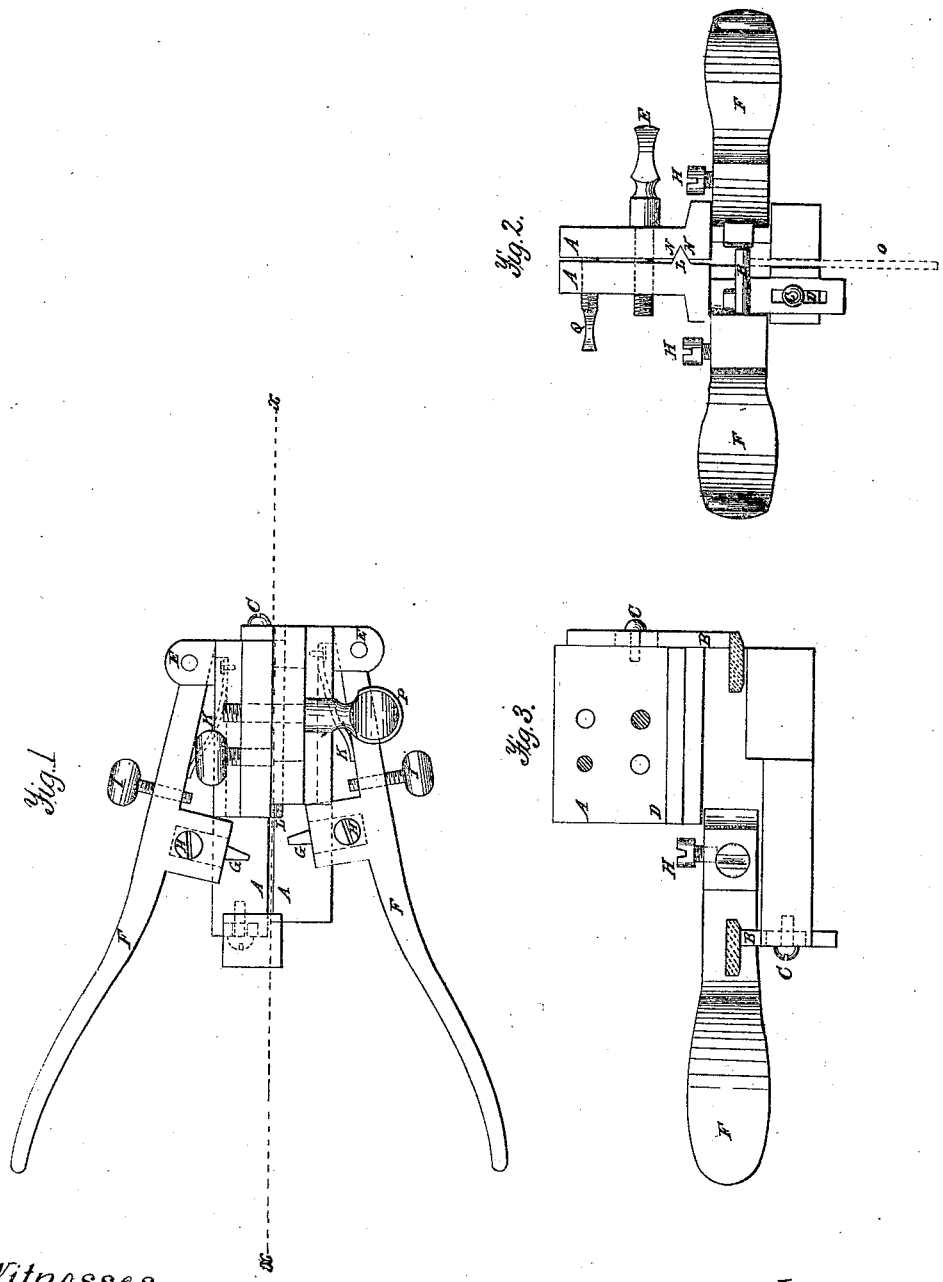

THOMAS CONNOLLY, OF NEW YORK, N. Y.

Letters Patent No. 60,697, dated January 1, 1867.

---

IMPROVEMENT IN SAW SETS.

---

*The Schedule referred to in these Letters Patent and making part of the same.*

---

Be it known that I, THOMAS CONNOLLY, of the city, county, and State of New York, have invented a new and improved Machine or Tool for Setting the Teeth of Saws; and I do hereby declare that the following is a full, clear, and exact description of the construction and operation of the same, reference being had to the annexed drawings, making a part of this specification, in which—

Figure 1 is a plane view.

Figure 2 is a front view; and

Figure 3 is a longitudinal section, as shown by the red line at $x\,x$, in fig. 1.

My machine or tool is constructed with two jaws marked A A upon figs. 1 and 3. These two jaws are intended to hold the saw true while being set. A section of the saw and the manner in which the jaws operate upon it is represented by the red line marked O, in fig. 2. There are also two brass rests or gauges marked B B, in fig. 3, upon which the teeth of the saw slide while being set. These brass gauges or rests are attached on each end of one of the jaws by set-screws marked C C in fig. 3; the set-screws working in a slot, as shown in fig. 2, marked D. By means of these set-crews working in the slots, as aforesaid, the brass gauges or rests may be adjusted so as to bring the teeth of the saw in a proper position to be set true. Attached to the two jaws by hinges, marked E E in fig. 1, are two levers, marked F F in figs. 1 and 2; these two levers are each provided with a steel punch, marked G G, in fig. 1; these punches are adjusted and held in their places by two set-screws, marked H H in figs. 1, 2, and 3. These two steel punches operate directly upon the teeth of the saw by means of the levers F F, thereby setting two teeth of the saw at once. The amount of set to be given to any saw I regulate by means of the two small thumb-screws marked I I in fig. 1. These two thumb-screws act directly upon the jaws and levers, thereby regulating the amount of set to be given to the teeth of the saw perfectly. I also have constructed two springs, marked K K, in fig. 1; these two springs are attached to the jaws, and operate upon the levers F F, so as to keep them always open when released from the hands, thus facilitating the operation of setting the teeth of the saw. I have also provided a thumb-screw, marked P, in figs. 1 and 2, which works in a slot in one of the jaws; this thumb-screw is intended to hold the jaws together firmly, and by working in the slot, as aforesaid, the jaws may be adjusted so as to bring the punches to act perfectly upon the teeth of either fine or coarse saws. There is also a V-joint upon the inner side of one of the jaws, marked L L in figs. 1, 2, and 3; which joint operates or slides in a corresponding groove in the opposite jaw, which groove is marked N N in fig. 2. By means of the said V-joint and groove the two jaws are kept perfectly straight and true while being moved backwards or forwards. There is also a small thumb-screw marked Q, in fig. 2, which serves also to hold the two jaws firmly together while setting the saw.

What I claim as new, and desire to obtain Letters Patent for, are—

1. I claim, in combination with the jaws A A, the two levers F F, with the two steel punches G G, which are attached to the levers, and which operate simultaneously upon two teeth of the saw in the manner as set forth.

2. I claim, also, the small thumb-screw Q, in combination with set-screw P and jaws A A, all constructed and arranged as set forth.

3. I claim the two thumb-screws I I, in combination with the jaws A A and levers F F, constructed and operating in the manner as set forth.

4. I claim the arrangement, as described, of all the parts, so that the device may be adjusted to set the teeth of either fine or coarse saws accurately, and otherwise operate, as set forth.

THOMAS CONNOLLY.

Witnesses:
WM. H. WILSON,
C. A. FORD.